Figure 1:
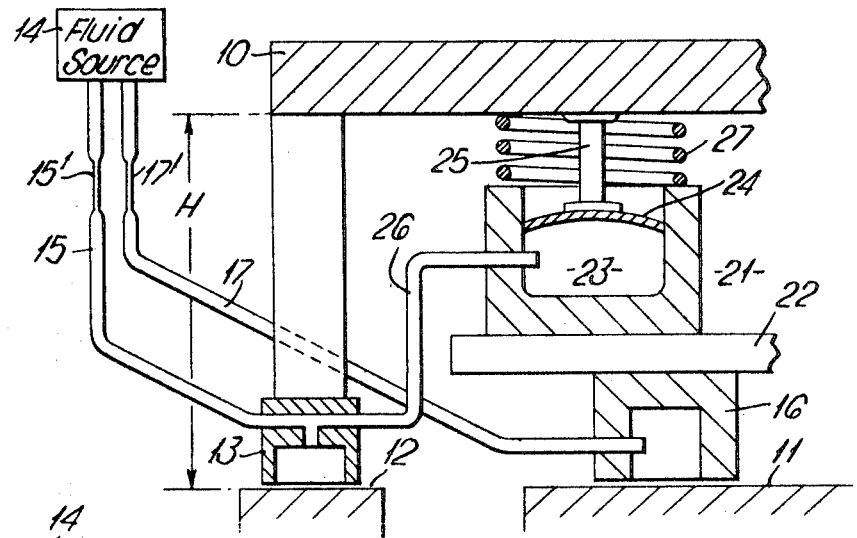

United States Patent

[11] 3,597,021

| [72] | Inventor | Graham Isaac Thomas<br>Edinburgh, Scotland |
|---|---|---|
| [21] | Appl. No. | 809,819 |
| [22] | Filed | Mar. 24, 1969 |
| [45] | Patented | Aug. 3, 1971 |
| [73] | Assignee | Ferranti, Limited<br>Hollinwood, England |
| [32] | Priority | Mar. 30, 1968 |
| [33] | | Great Britain |
| [31] | | 15,441/68 |

[54] SLIDE BEARING SYSTEMS FOR VARIABLE LOADS
4 Claims, 2 Drawing Figs.

| [52] | U.S. Cl. | 308/5, 184/5, 308/122 |
|---|---|---|
| [51] | Int. Cl. | F16m 11/00 |
| [50] | Field of Search | 308/5, 9, 122; 184/5 |

[56] References Cited
UNITED STATES PATENTS

| 2,889,704 | 6/1959 | Baker | 308/122 UX |
|---|---|---|---|
| 3,126,233 | 3/1964 | Royle | 308/122 |
| 3,137,530 | 6/1964 | Kohler | 308/5 |
| 3,260,162 | 7/1966 | Atherton | 184/5 X |
| 3,271,086 | 9/1966 | Deffrenne | 308/5 |
| 3,484,064 | 12/1969 | Koenig | 308/5 X |

*Primary Examiner*—Manuel A. Antonakas
*Attorney*—Cameron, Kerkam & Sutton

ABSTRACT: A bearing system in which a load (such as a worktable) is carried by a main bearing for a sliding movement over a plane surface while maintaining the height of the load above a plane reference surface constant despite variations in the weight of the load. That height is sensed by a reference pressure-lubricated bearing in engagement with the reference surface and the fluid pressure in it is applied to equalize the fluid pressure in an actuator located between the load and the main bearing so that any change in that height causes the actuator to adjust the distance between the load and the main bearing in a corrective sense.

PATENTED AUG 3 1971          3,597,021

SLIDE BEARING SYSTEMS FOR VARIABLE LOADS

This invention relates to bearings to allow movement of a load over a main surface, which may be planer or curved.

The load may for example be the worktable or other movable part of a machine tool; in which case the load may be liable to rapid changes in value due to changes in the resistance offered by the workpiece to the cutting tool. Or the load may be the probe-supporting gantry of an inspection machine. It should be understood that the invention is not restricted to those particular applications.

An object of the invention is to provide such a bearing in which the distance between the load and a reference surface is maintained substantially constant for different values of the load within a predetermined range.

A particular object is to provide such a bearing which responds rapidly to maintain that distance substantially constant despite changes in value of the load of the kind above mentioned.

In accordance with the present invention, a bearing to allow movement of a load over a main surface while maintaining the distance between the load and a reference surface substantially constant for different values of the load within a predetermined range includes a pressure-lubricated sensing bearing rigid with the load and in engagement with the reference surface, a source for supplying that bearing with fluid under pressure by way of a fluid resistance, a main bearing to support at least a part of the load, a fluid linear actuator coupling the load to the main bearing so as to control the distance between them in a direction normal to the reference surface, and a fluid channel between the sensing bearing and the actuator to equalize the fluid pressures in them, the actuator being designed to respond in such sense that in operation the arrangement acts as a closed-loop servo to maintain said distance substantially constant as aforesaid.

As used herein, the term "fluid linear actuator" means a device for directly effecting a straight line movement of an object, such as part of a machine tool, in dependence of fluid pressure.

Figure 2:
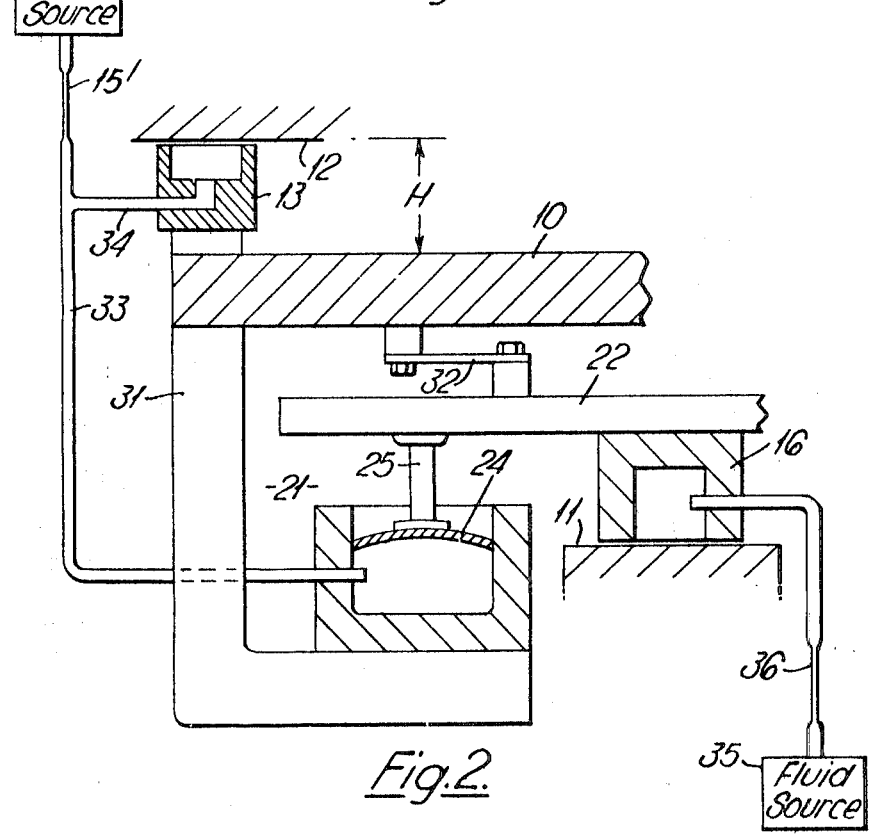

In the accompanying drawings,

FIG. 1 shows in part section a bearing in accordance with one embodiment of the invention where the main and reference surfaces are planar, and FIG. 2 shows in part section a bearing in accordance with another embodiment.

In the arrangement of FIG. 1, the load is shown at 10 and the main and reference surfaces, which are coplanar, at 11 and 12. The reference surface 12 may be part of the main surface; or it may be distinct from it (as shown in the drawing) to enable it to be made more precisely planar. For clarity, the size of the reference surface is exaggerated in the drawing; in practice it is considerably less than the main surface.

Rigid with the load is a pressure-lubricated sensing bearing 13 arranged to move with a slight clearance in bearing engagement with the reference surface and supplied with oil under pressure from a source 14 by way of pipe 15 constricted at 15$^1$ to provide a fluid resistance.

The main weight of the load 10 is taken by a main bearing 16, which in this example of the invention is also of the pressure-lubricated kind. The bearing engages surface 11 and is supplied with oil under pressure from source 14 by way of a pipe 17 having a resistive constriction 17$^1$. The load is coupled to this bearing by way of a fluid linear actuator 21 and a subframe 22.

Bearings 13 and 16 may each be of a known kind, and supplied through the appropriate fluid-resistive channel in known manner.

Actuator 21 is in the form of a chamber 23 sealed at the top by a resilient metal diaphragm 24 from which the load is supported by a pillar 25. A pipe 26 connects bearing 13 to the chamber to ensure that the oil pressure in them are equal.

Between the actuator and the load is a compression spring 27, which tends to urge them apart. The spring is of the low-rate kind, that is, a large excursion is required to bring about a small change of force.

In operation, it is assumed to begin with that a condition of equilibrium has been established with the height H of the load above the reference surface 12 possessing the desired value.

Suppose now there is an appreciable increase in the weight of the load. An effect of this is to bring both bearings 13 and 16 closer to surfaces 12 and 11, thereby reducing the height H to below the desired value. The corresponding increase of the oil pressure in bearing 13, imparted by way of pipe 26 to the oil H chamber 23, forces diaphragm 24 (and hence the load and bearing 13) upwards. The effective area of the diaphragm (that is, the area subjected to the oil pressure) is chosen to be such that this upward thrust on it corresponds to the increase in the load that has brought it about. Thus an equilibrium condition is regained with H at approximately the desired value. The exact original value of H is not restored, for bearing 13 has to be slightly nearer surface 12 than before in order to maintain the necessary increase in pressure of the oil in chamber 23; thus h is slightly less than the desired value.

Similarly if the weight of the load is reduced: the pressure in bearing 13 is reduced as the bearing moves away from surface 12 (thereby slightly increasing the value of H) and the corresponding reduction of the pressure acting on the diaphragm brings about a compensatory lowering of the height of the table.

Spring 27 is provided to take some of the load off the diaphragm. It is chosen so that the load transmitted to diaphragm 24 by pillar 25 may be adjusted to equality with the static force exerted on the diaphragm by the oil in chamber 23. The spring is given a low rate, as above mentioned, so that the equilibrium of the system should not be disturbed by alterations of the spring force due to changes of its length.

The arrangement thus acts as a closed-loop servo. The error signal is the difference between the actual oil pressure in bearing 13 and the value corresponding to the desired value of H; in response to this error signal actuator 21 operates in the sense to null it, and so maintain the value of H substantially constant for different values of the load within a predetermined range.

Bearing 13 and the reference surface 12 may be of any conveniently small dimensions, since they are not required to carry any appreciable proportion of the load but merely to act as a sensing device. The term "bearing," as applied to component 13, should accordingly be understood in that sense.

The accuracy with which the desired value of H is maintained as the load moves over the common surface 11 is dependent on the truth of surface 12 only, and because of its small area and light loading little difficulty need be experienced in giving that surface the necessary accuracy.

The main surface 11, on the other hand, may even be allowed to deflect under the load as the load moves over it. For the same reason bearing 16 need not be of any especial accuracy; it need not—for example—be of the pressure-lubricated kind, but instead may be a roller bearing or even an air bearing.

The actuator may alternatively be of the piston and cylinder kind—that is, with diaphragm 23 replaced by a piston. This however is seldom a preferable alternative, for the movement of the actuator is usually so slight that a diaphragm is quite a satisfactory arrangement and is moreover free from the risk of oil seepage to which a piston-and-cylinder might well be liable.

In an alternative arrangement the reference surface may face downwards, so that the reference bearing carries no part of the load but instead slightly augments it. Such an arrangement is shown in FIG. 2, in which the components which correspond to those previously described are identified by their previous reference numerals.

The reference surface 12 and bearing 13 are shown inverted, the bearing being secured to the load 10 as before. As the sense of the error signal is reversed in this aragement—that is, an increase in the load causes a reduction of the oil pressure in the reference bearing, and vice versa—the actuator 21 requires modification so as to respond to the changes of oil pressure in that reverse manner.

This is effected in the present arrangement by securing the actuator to a bracket 31 which is dependent from the load 10 so as to bring the actuator underneath the subframe 22. The spring 27 of the FIG. 1 arrangement could be used as before to relieve the diaphragm 24 of part of the load. Alternatively, as shown in FIG. 2, the function of the coiled spring 27 may be exercised by a leaf spring 32 secured at its ends to the load 10 and subframe 22 respectively.

In this arrangement the fluid channel which equalizes the pressures in the sensing bearing 13 and the actuator 21 is composed of the pipes 33 and 34 leading to them from the fluid resistance 15$^1$.

The main bearing 16 may be as before, supplied either from source 14 as before or from an independent source 35 through a fluid resistance 36. As with the arrangement of FIG. 1, the main bearing may be other than of the pressure-lubricated kind.

The distance H, which is to be kept substantially constant, is again that between the load 10 and the reference surface 12.

The invention is also applicable where the movement is along a curved surface, such as a supporting shaft. The reaction of the bearing is here along a line extending radially from the shaft; usually two or more such bearings are required, at displaced angular positions around the shaft.

The invention may also be used where the main bearing is a thrust bearing, rather than a supporting bearing as described above.

A bearing in accordance with the invention is found to have a good dynamic response to changes of the load or other variations of the operating conditions, such as vibration of the tool, so as to maintain the distance between the load and a reference surface constant to a high degree of accuracy.

What I claim is:

1. In combination with a load and a reference surface, a bearing system for allowing movement of the load over a main surface while maintaining the distance between the load and the reference surface substantially constant for different values of the load within a predetermined range, the bearing system including
    a. a pressure-lubricated sensing bearing rigid with the load and in engagement with the reference surface,
    b. means for supplying the sensing bearing with oil under pressure by way of a fluid resistance,
    c. a main bearing for supporting at least part of the load,
    d. a fluid linear actuator coupling the load to the main bearing and operative to control the distance between the load and the main bearing in a direction normal to the reference surface,
    e. and a fluid channel in fluid communication with the sensing bearing and the actuator for equalizing the oil pressures in the sensing bearing and the actuator,
    f. the actuator being so constructed and arranged as to respond to variations in the oil pressure therein in such sense that in operation the bearing system acts as a closed-loop servo to maintain the distance between the load and the reference surface substantially constant for different values of the load within a predetermined range.

2. The combination as claimed in claim 1 wherein the actuator includes a fluid chamber sealed by a resilient diaphragm the movement of which relative to the chamber is applied to control the said distance between the load and the main bearing.

3. The combination as claimed in claim 2 wherein spring means is provided to relieve the diaphragm of part of the weight of the load.

4. The combination as claimed in claim 1 wherein the main bearing is a pressure-lubricated bearing.